Jan. 15, 1957    C. E. BRANICK    2,777,507
DEVICE FOR MOUNTING RIMS ON PNEUMATIC TIRE CASINGS
Filed April 19, 1954    2 Sheets-Sheet 1
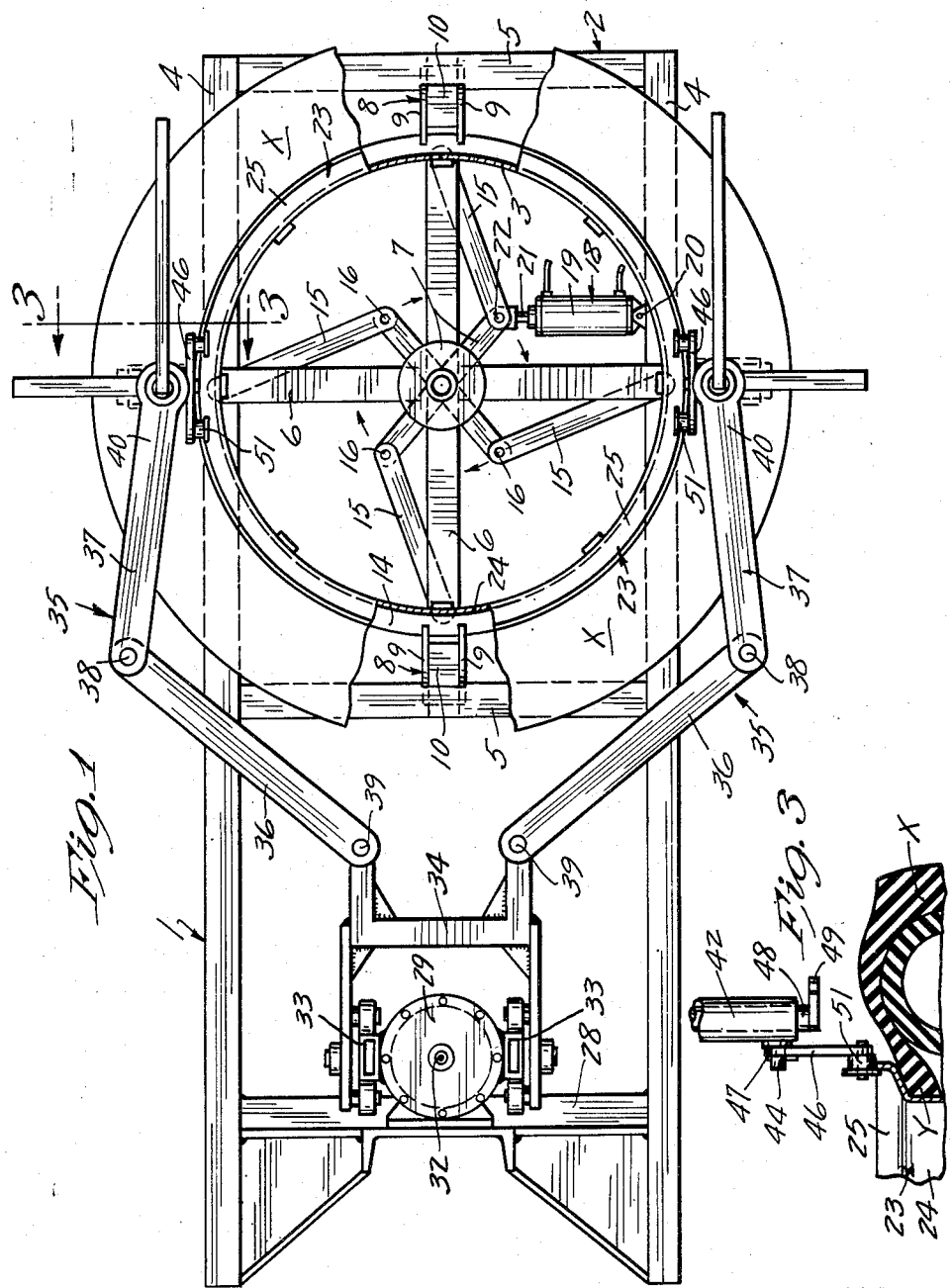
INVENTOR.
Charles E. Branick
BY
Merchant & Merchant
ATTORNEYS

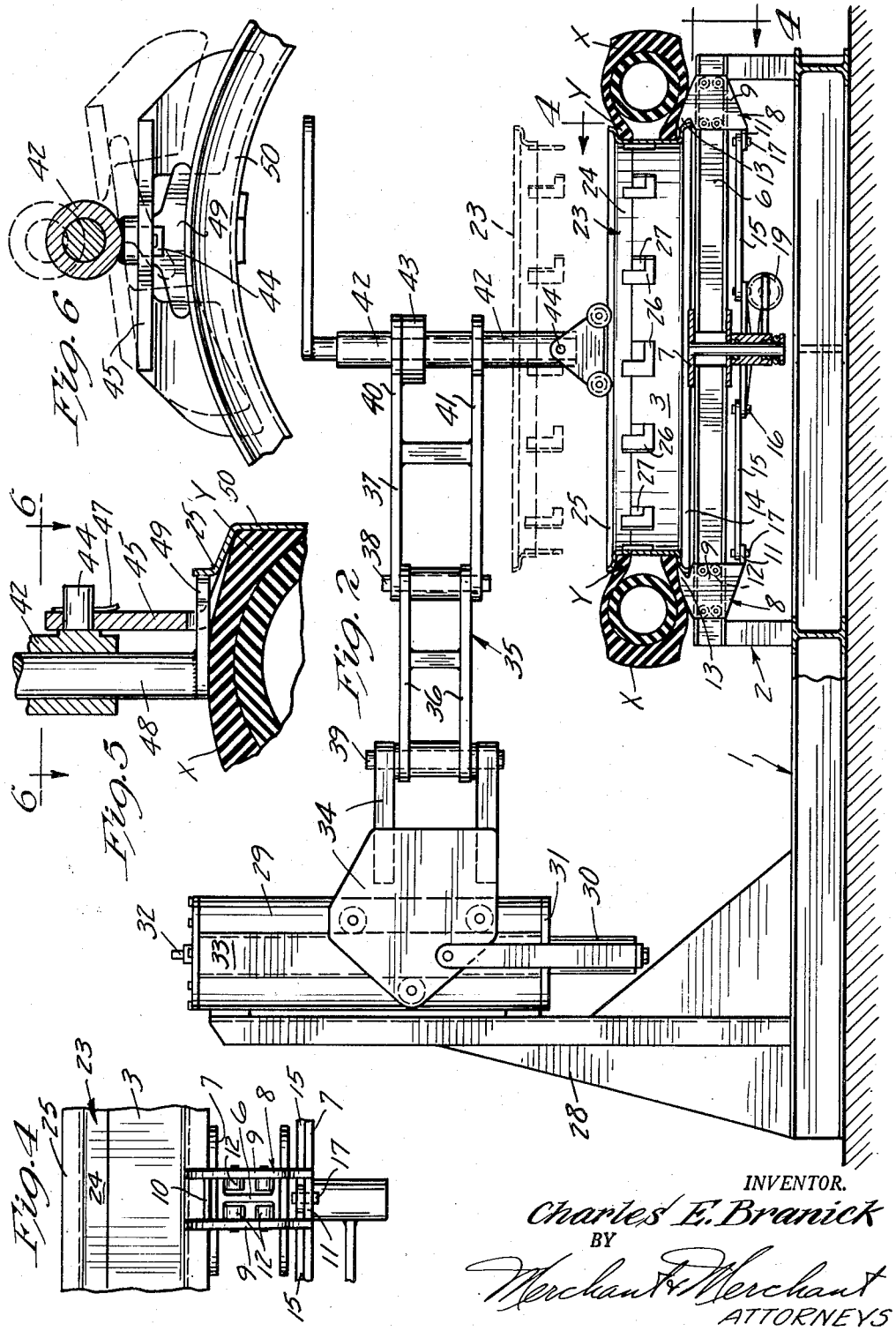

United States Patent Office 2,777,507
Patented Jan. 15, 1957

2,777,507
DEVICE FOR MOUNTING RIMS ON PNEUMATIC TIRE CASINGS

Charles E. Branick, Fargo, N. Dak.

Application April 19, 1954, Serial No. 423,903

2 Claims. (Cl. 157—1)

My invention relates to devices for securing cooperating rim sections to pneumatic tires and is in the nature of an improvement upon or modification of the structure disclosed in my co-pending application, Serial No. 408,904, filed February 8, 1954, now Patent No. 2,755,847 and entitled "Pneumatic Tire Bead Depressor."

The primary object of my invention is the provision of improvements in devices of the class above-described, whereby the tire rim section supported thereby may be securely locked against rotary or upward movements during the operation of removing therefrom or securing thereto the overlying cooperating rim section.

A still further object of my invention is a novel roller-equipped rim flange engaging presser foot which may be utilized in the securing of the upper rim section to the lower one thereof whereby frictional engagement between the presser foot and rim section is reduced to a minimum to facilitate rotation of the upper rim section with respect to the lower rim section.

A still further object of my invention is the provision of a device of the class above-described which is rugged and durable in construction, has a minimum of working parts and is extremely simple and easy to operate.

The above and still further objects of my invention will become apparent from the following detailed specification, appended claims and attached drawings.

Referring to the drawings wherein like characters indicate like parts throughout the several views:

Fig. 1 is a view in top plan of my novel device;

Fig. 2 is a view partly in side elevation and partly in vertical axial section, some parts being broken away;

Fig. 3 is an enlarged fragmentary sectional view taken substantially on the line 3—3 of Fig. 1;

Fig. 4 is a fragmentary view in side elevation, as seen from the line 4—4 of Fig. 2, some parts being removed;

Fig. 5 is a view corresponding to Fig. 3, but showing a modified structure; and

Fig. 6 is a fragmentary view, partly in plan and partly in horizontal section, taken substantially on the line 6—6 of Fig. 5.

Referring with greater particularity to the drawings, the numeral 1 indicates a base upon one end of which is mounted an upstanding skeleton-like platform, identified in its entirety by the numeral 2, for supporting a rim section 3 in a horizontal position. Preferably and as shown, the platform 2 is generally rectangular in shape and includes laterally-spaced parallel side frame members 4, end frame members 5, and guide-acting cross frame members 6, which, as shown particularly by Fig. 4, are in the nature of I-beams.

For positively locking the rim section 3, placed upon the platform 2, against rotation and upward movements, I provide an axial head 7 mounted for pivotal movements on a vertical axis at the point of intersection of said I-beams 6. Mounted for longitudinal reciprocal movements on the radially outer portions of the guide-acting I-beams 6 are traveler members 8 which, as shown particularly in Fig. 4, comprise laterally-spaced vertical side plates 9 tied together by means of upper and lower plates 10 and 11 respectively, overlying and underlying respectively the upper and lower flanges of the I-beams 6. Anti-friction means in the nature of opposed pairs of rollers 12 ride upon the upper and lower flanges of the I-beams 6. As shown, the side plates 9 project above the level of the I-beams 6 and define opposed hook-acting lugs 13 which engage at circumferentially-spaced points the radially outwardly projecting rim flanges 14 of the rim sections 3, upon inward movements of the traveler members 8. Links 15 have their inner ends pivotally connected at circumferentially-spaced points to the head 7, as indicated at 16, whereas the outer ends thereof are pivotally secured as at 17, one each to one of the traveler members 8. Preferably and as shown, particularly by reference to Fig. 1, a conventional air motor 18 is utilized to impart longitudinal sliding movements to the carrier members 8, the cylinder 19 thereof being pivotally secured as at 20 to one of the side frame members 4, whereas the plunger 21 thereof is secured, as at 22, to one of the pivotal connections 16.

It should be obvious that when a tire rim section 3 is placed upon the platform 2, either with or without a pneumatic tire X mounted thereon, that actuation of the air motor 18 to cause the plunger 21 to contract within the cylinder 19, as shown in Fig. 1, will cause rotary movements to be imparted to the head 7 in the direction of the arrows and cause the links 15 to impart radially inward movements to the traveler members 8 on the guide-acting I-beams 6. This movement causes the hook-acting lugs 13 to engage at circumferentially-spaced points the rim flange 14—thus positively locking the rim section 3 against rotary and upward movements. Thereafter, if same has not already been done, the pneumatic tire X is placed over the horizontally-disposed, securely-anchored rim section 3; and finally an upper cooperating rim section 23 is caused to be axially aligned with the rim section 3 with its cylindrical portion 24 projecting through the central opening in the tire X and the flange 25 being supported on the bead portion Y of said tire X.

Frequently, in tire retreading operations, it is extremely difficult to manually compress the bead portions Y of large pneumatic tire casings X sufficiently to enable the overlying rim sections 23 to be rotated manually sufficiently to cause the hook-acting portions 26 thereof to engage the lugs 27 of the rim section 3. For the purpose of bringing adequate pressure to bear upon the upper rim section 23 to depress the beads Y, I provide supporting structure 28 for a vertically disposed cylinder 29 having therein a fluid pressure operated piston, not shown, secured to a plunger rod 30 projecting downwardly through a head 31. Fluid under pressure is introduced into the cylinder 29 above the piston, through a valve-equipped stem or the like 32. Return of the piston and plunger 30 to its uppermost limits may be accomplished by any suitable means such as a coil spring, not shown, within the piston. Mounted for vertical reciprocal movements on guide rails 33 on opposite sides of the cylinder 29 is a carriage 34. Secured to the carriage 34 for common vertical reciprocal movements therewith are a pair of laterally-spaced arms, identified in their entireties by the numeral 35, and each including arm sections 36 and 37 which are pivotally secured together as at 38. The inner ends of the arms 36 are pivotally secured as at 39 to the carriage 34 for swinging movements of the arms 35 in a common horizontal plane overlying the rim supporting platform 2.

As disclosed and claimed in my above-identified co-pending application, the free end portions of the arm sections 37 are bifurcated, the upper and lower forked portions thereof being identified respectively by the numerals 40 and 41. Tubular shafts 42 are received in aligned openings, not specifically identified, in the upper and lower portions 40 and 41 of the arm sections 37 for rotation and limited axial sliding movements, said sliding movements being specifically limited by means of a collar 43 which engages the members 40 and 41. Projecting radially outwardly from the tubular shafts 42, adjacent their lower ends, are trunnions 44, upon which are adapted to be alternately received presser foot elements 45, of the type shown in Fig. 5, or 46, of the type shown in Fig. 3. In either event, the presser foot elements 45 or 46 are retained in position on the trunnions 44 by means of cotter keys or the like 47. Presser foot elements 45 are of the type utilized in conjunction with the shafts 48 having cam portions 49 projecting radially outwardly from their lower end portions, to break the bead portions Y of a tire casing X away from a rim 50 (all as more fully explained in my above-identified co-pending application), whereas presser foot elements 46 are provided with flanged rollers 51 to ride upon the upwardly-projecting circumferential flange 25 of the tire rim section 23 for the purpose of jointly depressing same and the bead portion Y of a tire X to permit attachment thereof to its cooperating rim section 3. The rollers 51 cause a minimum of frictional engagement between the presser foot elements 46 and rim section 23 during rotation of the latter with respect to the underlying rim section 3 for the purpose of causing interlocking engagement between the locking elements 26 and 27. The position of the carriage 34 and arms 35 with respect to the tubular shaft 42 and collar 43 carried thereby to cause lowering movements to be imparted to the presser foot elements 46 is well-illustrated by Fig. 2.

The pivotal connections 38 and 39 of the arms 35 facilitate accurate placement of the presser foot elements 45 and 46 in working position upon or adjacent the rim sections 3, 23 and also permit folding of the arms 35 against or in close proximity to the carriage 34 when not in use.

The mounting of the shafts 42 in the aligned openings of the arm sections 37 for rotation facilitates positioning of the presser foot elements 44 and 45 with respect to said rim sections 3, 23. The mounting of said shafts 42 for sliding movements limited by engagement of the collar 43 between the members 40 and 41, makes possible limited manual lifting of the presser foot elements 44 and 45 for purposes of placement on or in conjunction with rim sections 3, 23 with the vernier movements of the carriage 34.

My invention has been thoroughly tested and found to be completely satisfactory for the accomplishment of the above objects and while I have shown a preferred embodiment thereof, it should be obvious that same is capable of modification without departure from the scope of the appended claims.

What I claim is:

1. In a device for mounting rims on pneumatic tire casings, a base, a skeleton-like platform on said base for supporting pneumatic tire-equipped rim sections in a horizontal position, means for locking said rim sections against upward and rotary movements with respect to said platform, a carriage, structure mounting said carriage on said base in laterally spaced relation to said rim mounting means for reciprocal movements in a vertical plane, an arm pivotally secured to said carriage for swinging movements of its free end in a horizontal plane overlying said rim supporting platform, said arm comprising pivotally interconnected sections, and a depending presser foot element rotatably carried by the free end of said arm and operative responsive to movements of said carriage, said presser foot element being provided with laterally spaced flanged rollers adapted to ride upon the upwardly projecting circumferential flange of a tire rim section.

2. In a device for mounting rims on pneumatic tire casings, a base, a skeleton-like platform on said base for supporting pneumatic tire-equipped rim sections in a horizontal position, means for locking said rim sections against upward and rotary movements with respect to said platform, a carriage, structure mounting said carriage on said base in laterally spaced relation to said mounting means for reciprocal movements in a vertical plane, a pair of pivotally interconnected arm sections each pivotally connected to the carriage for swinging movements of their free end sections in horizontal planes overlying opposite sides of said rim supporting platform, and a depending pressure foot element rotatably carried by each free end section of said pair of arms and having roller elements adapted to ride upon the circumferential flange of a rim on said supporting platform.

References Cited in the file of this patent

UNITED STATES PATENTS

| | | |
|---|---|---|
| 1,201,197 | Kraft et al. | Oct. 10, 1916 |
| 1,416,094 | Krauska | May 16, 1922 |
| 1,445,784 | Mayer et al. | Feb. 20, 1923 |
| 1,667,351 | Levitt | Apr. 24, 1928 |
| 1,793,864 | Manley | Feb. 24, 1931 |
| 1,819,428 | Manley | Aug. 18, 1931 |
| 2,351,355 | Merrett | June 13, 1944 |
| 2,616,487 | Parks | Nov. 4, 1952 |
| 2,653,653 | Weaver | Sept. 29, 1953 |